United States Patent
Salter et al.

(10) Patent No.: US 9,694,743 B2
(45) Date of Patent: Jul. 4, 2017

(54) DUAL PURPOSE LIGHTING ASSEMBLY

(71) Applicant: Ford Global Technologies, LLC, Dearborn, MI (US)

(72) Inventors: Stuart C. Salter, White Lake, MI (US); James J. Surman, Clinton Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 198 days.

(21) Appl. No.: 14/730,992

(22) Filed: Jun. 4, 2015

(65) Prior Publication Data
US 2015/0266418 A1   Sep. 24, 2015

Related U.S. Application Data

(63) Continuation-in-part of application No. 14/603,636, filed on Jan. 23, 2015, now Pat. No. 9,573,517, which is a continuation-in-part of application No. 14/086,442, filed on Nov. 21, 2013.

(51) Int. Cl.
| | |
|---|---|
| B60Q 1/00 | (2006.01) |
| B60Q 1/26 | (2006.01) |
| B60Q 3/02 | (2006.01) |
| H05B 37/02 | (2006.01) |
| B60Q 1/32 | (2006.01) |
| B60Q 3/68 | (2017.01) |
| B60Q 3/217 | (2017.01) |
| B60Q 3/74 | (2017.01) |
| B60Q 3/80 | (2017.01) |

(52) U.S. Cl.
CPC .......... *B60Q 3/0293* (2013.01); *B60Q 1/323* (2013.01); *B60Q 3/217* (2017.02); *B60Q 3/68* (2017.02); *B60Q 3/745* (2017.02); *B60Q 3/80* (2017.02); *H05B 37/0218* (2013.01); *H05B 37/0227* (2013.01); *B60Q 2400/40* (2013.01); *Y02B 20/46* (2013.01)

(58) Field of Classification Search
CPC ...... B60Q 1/323; B60Q 3/0293; B60Q 3/217; B60Q 3/68; B60Q 3/745; B60Q 3/76; B60Q 3/78; B60Q 3/80; B60Q 2400/40; H05B 37/0218; H05B 37/0227
USPC .................. 362/486–487, 501, 509–510
See application file for complete search history.

(56) References Cited

U.S. PATENT DOCUMENTS

| | | |
|---|---|---|
| 5,709,453 A | 1/1998 | Krent et al. |
| 6,031,511 A | 2/2000 | DeLuca et al. |
| 6,117,362 A | 9/2000 | Yen et al. |
| 6,494,490 B1 | 12/2002 | Trantoul |
| 6,577,073 B2 | 6/2003 | Shimizu et al. |
| 6,729,738 B2 | 5/2004 | Fuwausa et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A dual purpose lighting assembly for a vehicle is provided herein. The dual purpose lighting assembly includes a puddle lamp assembly disposed proximate a doorway and operable to emit light by luminescence to illuminate a ground area outside the vehicle and a dome lamp assembly disposed next to the puddle lamp assembly and operable to emit light by luminescence to illuminate a vehicle cabin area.

18 Claims, 3 Drawing Sheets

(56) References Cited

U.S. PATENT DOCUMENTS

| | | |
|---|---|---|
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

DUAL PURPOSE LIGHTING ASSEMBLY

CROSS-REFERENCE TO THE RELATED APPLICATIONS

This application is a continuation-in-part of U.S. patent application Ser. No. 14/603,636, filed Jan. 23, 2015, entitled "DOOR ILLUMINATION AND WARNING SYSTEM," now U.S. Pat. No. 9,573,517, which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems and more particularly relates to vehicle lighting systems employing photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a dual purpose lighting assembly for a vehicle is provided. A puddle lamp assembly is disposed proximate a doorway and operable to emit light by luminescence to illuminate a ground area outside the vehicle. A dome lamp assembly is disposed next to the puddle lamp assembly and operable to emit light by luminescence to illuminate a vehicle cabin area.

According to another aspect of the present invention, a dual purpose lighting assembly for a vehicle is provided. A puddle lamp assembly is located adjacent a doorway and operable to emit light by luminescence to illuminate a ground area outside the vehicle. A dome lamp assembly is disposed next to the puddle lamp assembly and operable to emit light by luminescence to illuminate a vehicle cabin area. The puddle and dome lamp assemblies are each coupled to a roof structure.

According to yet another aspect of the present invention, a dual purpose lighting assembly is provided. A first light-producing assembly is disposed proximate a doorway and operable to emit light in a vehicle-outward direction. A second light-producing assembly is disposed next to the first light-producing assembly and operable to emit light in a vehicle-inward direction. A controller is provided for selectively operating the first and second light-producing assemblies based on at least one input signal.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure is related to a dual purpose lighting assembly for use in a vehicle and operable as a puddle lamp and a dome lamp. While the dual purpose lighting assembly is contemplated for use in automobiles, it should be appreciated that the dual purpose lighting assembly disclosed herein may be similarly adapted for use in other types of vehicles designed to transport one or more passengers such as, but not limited to, all-terrain vehicles, aircraft, watercraft, and locomotives.

Figure 1:
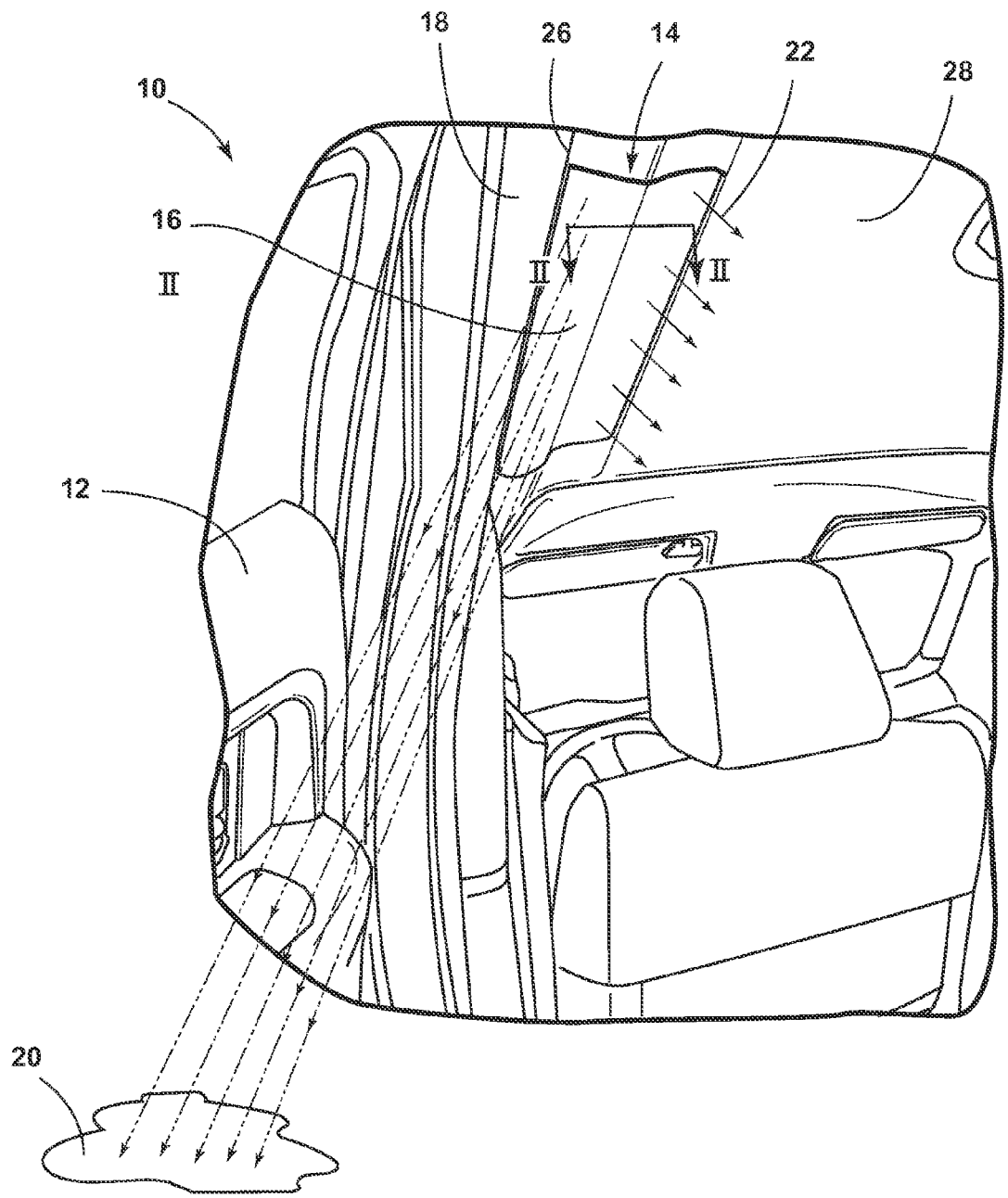
FIG. 1 illustrates a vehicle equipped with a dual purpose lighting assembly, according to one embodiment.

Referring to FIG. 1, a vehicle 10 is generally shown with a rear passenger door 12 moved to an open position. A dual purpose lighting assembly 14 is located in the vehicle cabin and includes a puddle lamp assembly 16 disposed proximate a doorway 18 and operable to emit light by luminescence to illuminate a ground area 20 outside the vehicle 10. The dual purpose lighting assembly 14 also includes a dome lamp assembly 22 disposed next to the puddle lamp assembly 16 and operable to emit light by luminescence to illuminate a vehicle cabin area that includes an occupant seating area 24 next to the doorway 18. According to the illustrated embodiment, the puddle lamp assembly 16 is coupled to an edge 26 of a roof structure 28 located adjacent the doorway 18 whereas the dome lamp assembly 22 is coupled to the roof structure 28 and is located at a greater distance from the doorway 18 relative to the puddle lamp assembly 16. The puddle lamp assembly 16 and the dome lamp assembly 22 may be arranged in various sizes and lengths. Also, additional dual purpose lighting assemblies may be similarly arranged near other doorways of the vehicle 10.

Figure 2:
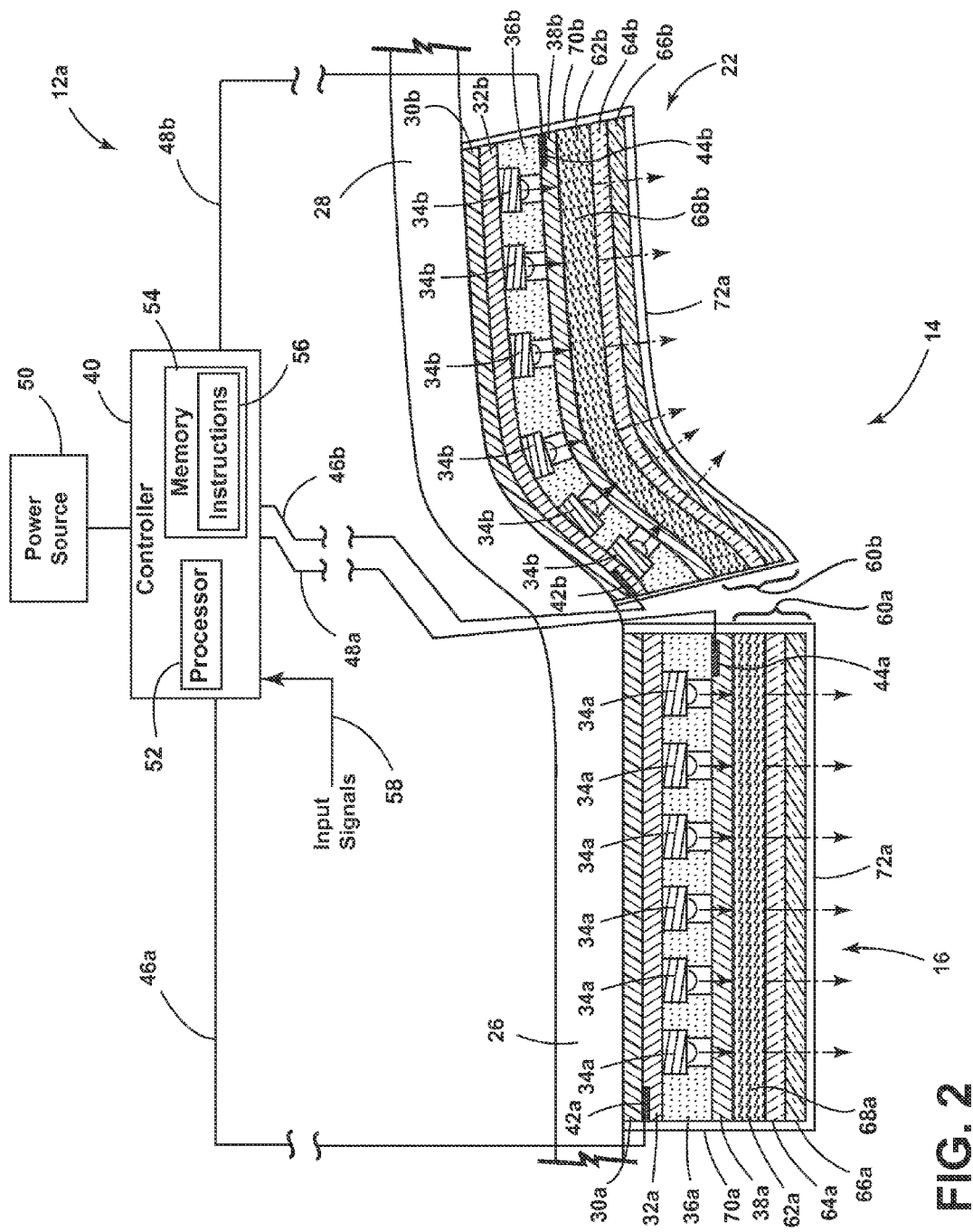
FIG. 2 is a cross-sectional view of a dual purpose lighting assembly taken along line II-II of FIG. 1, according to one embodiment.

Referring to FIG. 2, a cross-sectional view of the dual purpose lighting assembly 14 is shown according to one embodiment. As shown, the dual-purpose lighting assembly 14 may be arranged below the roof structure 28 and contoured thereto. In the presently illustrated embodiment, the roof structure 28 may correspond to a headliner and the puddle lamp and dome lamp assemblies 16, 22 may together define a curved structure, wherein the dome lamp assembly 22 is higher positioned relative to the puddle lamp assembly 16. In other embodiments, the puddle lamp and dome lamp assemblies 16, 22 may take on other shapes depending on the contour of the headliner as well as the presence of fixtures such as grab handles. As described in greater detail below, the puddle and dome lamp assemblies 16, 22 may be similarly configured and may each benefit from a thin design such that the amount of overhead space occupied by the dual purpose lighting assembly 14 is negligible. For purposes of clarity, the puddle and dome lamp assemblies 16, 22 are shown slightly spaced apart. However, it is to be understood that puddle and dome lamp assemblies 16, 22 may be in abutting contact such that the dual purpose lighting assembly 14 appears as a single structure.

As shown in FIG. 2, the puddle and dome lamp assemblies 16, 22 each include a substrate 30a, 30b coupled to the underside of the roof structure 28. The substrates 30a, 30b may include a polycarbonate, poly-methyl methacrylate (PMMA), or polyethylene terephthalate (PET) material on the order of 0.005 to 0.060 inches thick. A positive electrode 32a, 32b is arranged below each substrate 30a, 30b and includes a conductive epoxy such as, but not limited to, a silver-containing or copper-containing epoxy. Each of the positive electrodes 32a, 32b are electrically connected to a corresponding plurality of light sources such as LEDs 34a and 34b, which are arranged within a semiconductor ink 36a, 36b and applied to the underside of the positive electrode 32a, 32b. A negative electrode 38a, 38b is also electrically connected to the LEDs 34a, 34b and is arranged below the semiconductor ink 36a, 36b. The negative electrodes 38a, 38b each include a transparent or translucent conductive material such as, but not limited to, indium tin oxide. In alternative embodiments, the positive electrodes 32a, 32b may be flip-flopped with the corresponding negative electrodes 38a, 38b, in which case the positive electrodes 32a, 32b should include a transparent or translucent conductive material to transmit light emitted by the associated LEDs 34a, 34b.

The positive and negative electrodes 32a, 38a of the puddle lamp assembly 16 are each electrically connected to a controller 40 via a corresponding bus bar 42a, 44a and a corresponding conductive lead 46a, 48a. The bus bars 42a, 44a may be printed along opposite edges of the positive and negative electrodes 32a, 38a and the points of connection between the bus bars 42a, 44a and the conductive leads 46a, 48a may be at opposite corners of each bus bar 42a, 44a to promote uniform current distribution along the bus bars 42a, 44a. Likewise, the positive and negative electrodes 32b, 38b of the dome lamp assembly 22 may also be connected to the controller 40 via a corresponding bus bar 42b, 44b and a corresponding conductive lead 46b, 48b at opposite corners of the bus bars 42b, 44b. In alternative embodiments, the positive and negative electrodes 32b, 38b of the dome lamp assembly 22 may be connected to a separate controller, if desired. The conductive leads 46a, 48a, 46b, 48b may be wired through the roof structure 28 of the vehicle 10 to the controller 40, which may be variously located in the vehicle 10 and is also electrically connected to a power source 50. In one embodiment, the power source 50 may correspond to a vehicular power source operating at 12 to 16 VDC.

The controller 40 may include a processor 52 and a memory 54 that stores instructions 56 that are executed by the processor 52. The instructions enable the controller 40 to selectively control the LEDs 34a, 34b based on one or more input signals 58, which may be received from vehicle equipment, user-operated switches, and the like. In one embodiment, the input signals 58 may include a vehicle-related condition such as, but not limited to, an operational state of the vehicle, a status related to a particular vehicle equipment (e.g., door open status), a key fob proximity status, a remote signal sourced from a portable electronic device, a status related to an operating environment of the vehicle (e.g., an ambient light level), or any other information or control signal that may be utilized to activate or otherwise adjust the output of the LEDs 34a, 34b.

The LEDs 34a, 34b may be dispersed in a random or controlled fashion within the semiconductor ink 36a, 36b and are disposed facing the vehicle cabin and may be configured to emit focused or non-focused light. The LEDs 34a, 34b may correspond to micro-LEDs of gallium nitride elements on the order of 5 to 400 microns in size and the semiconductor ink 36a, 36b may include various binders and dielectric material including, but not limited to, one or more of gallium, indium, silicon carbide, phosphorous, and/or translucent polymeric binders. In some embodiments, the LEDs 34a, 34b and semiconductor ink 36a, 36b may be sourced from Nth Degree Technologies Worldwide Inc. The semiconductor ink 36a, 36b can be applied through various printing processes, including ink jet and silk screen processes to selected portion(s) of the positive electrode 32a, 32b. More specifically, it is envisioned that the LEDs 34a, 34b are dispersed within the semiconductor ink 36a, 36b, and shaped and sized such that a substantial quantity of them align with the corresponding positive electrode 32a, 32b and the negative electrode 38a, 38b during deposition of the semiconductor ink 36a, 36b.

Referring still to FIG. 2, a photoluminescent structure 60a, 60b is arranged below each negative electrode 38a, 38b. The photoluminescent structures 60a and 60b may be arranged as a coating, layer, film or other suitable deposition. With respect to the presently illustrated embodiment, each photoluminescent structure 60a, 60b may be arranged as a multi-layered structure including an energy conversion layer 62a, 62b, an optional stability layer 64a, 64b, and an optional protection layer 66a, 66b. Each energy conversion layer 62a, 62b includes at least one photoluminescent material 68a, 68b having energy converting elements with phosphorescent or fluorescent properties. For example, each photoluminescent material 68a, 68b may include organic or inorganic fluorescent dyes including rylenes, xanthenes, porphyrins, phthalocyanines. Additionally or alternatively, each photoluminescent material 68a, 68b may include phosphors from the group of Ce-doped garnets such as YAG:Ce. Each energy conversion layer 62a, 62b may be prepared by dispersing the photoluminescent material 68a, 68b in a polymer matrix to form a homogenous mixture using a variety of methods. Such methods may include preparing each energy conversion layer 62a, 62b from a formulation in a liquid carrier medium and coating each energy conversion layers 62a, 62b to the negative electrode 38a, 38b. Each energy conversion layer 62a, 62b may be applied to the corresponding negative electrode 38a, 38b by painting, screen printing, flexography, spraying, slot coating, dip coating, roller coating, and bar coating. Alternatively, each energy conversion layer 62a, 62b may be prepared by methods that do not use a liquid carrier medium. For example, each energy conversion layer 62a, 62b may be rendered by dispersing the photoluminescent material 68a, 68b into a solid state solution (homogenous mixture in a dry state) that may be incorporated in a polymer matrix formed by extrusion, injection, compression, calendaring, thermoforming, etc.

To protect the photoluminescent material 68a, 68b contained within each energy conversion layer 62a, 62b from photolytic and thermal degradation, each photoluminescent structure 60a, 60b may optionally include a stability layer 64a, 64b, which may be configured as a separate layer optically coupled and adhered to the energy conversion layer 62a, 62b or otherwise integrated therewith. Each photoluminescent structure 60a, 60b may also optionally include a protection layer 66a, 66b optically coupled and adhered to the stability layer 64a, 64b or other layer to protect the photoluminescent structure 60a, 60b from physical and chemical damage arising from environmental exposure. The stability layer 64a, 64b and/or the protection layer 66a, 66b may be combined with the corresponding energy conversion layer 62a, 62b through sequential coating or printing of each layer, sequential lamination or embossing, or any other suitable means. Additionally, the puddle and dome lamp assemblies 16, 22 may each include an over-mold 70a, 70b having an optical element 72a, 72b for dispersing luminescent light outputted from the corresponding photoluminescent structure 60a, 60b. For instance, optical element 72a is configured to substantially disperse luminescent light outputted from photoluminescent structure 60a in a vehicle-outward direction such as toward the ground area 20 depicted in FIG. 1. Conversely, optical element 72b substantially disperses luminescent light outputted from photoluminescent structure 60b in a vehicle-inward direction such as toward occupant seating area 24 depicted in FIG. 1.

Additional information regarding photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference. Also, additional information regarding printed LED arrangements is disclosed in U.S. Patent Publication No. 2014-0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

In operation, each of the photoluminescent materials 68a, 68b are configured to luminesce in response to excitation by light emitted by the corresponding LEDs 34a, 34b. More specifically, light emitted from the LEDs 34a, 34b undergo an energy conversion process and is re-emitted from the corresponding photoluminescent materials 68a, 68b at a different wavelength. Light emitted by the LEDs 34a, 34b is referred to herein as inputted light and is demonstrated in FIG. 2 by solid arrows, whereas light re-emitted from the photoluminescent materials 68a, 68b is referred to herein as converted light or luminescent light and is demonstrated in FIG. 2 by broken arrows.

According to one embodiment, the photoluminescent materials 68a, 68b may each be formulated to convert inputted light into a longer wavelength light, otherwise known as down conversion. Alternatively, the photoluminescent materials 68a, 68b may each be formulated to convert inputted light into a shorter wavelength light, otherwise known as up conversion. Under either approach, light converted by the photoluminescent materials 68a, 68b may be subsequently outputted from the corresponding photoluminescent structure 60a, 60b or otherwise used in an energy cascade, wherein the converted light serves as inputted light to excite another formulation of photoluminescent material located within the energy conversion layer 62a, 62b, whereby the subsequent converted light may then be outputted from the photoluminescent structure 60a, 60b or used as inputted light, and so on. With respect to the energy conversion processes described herein, the difference in wavelength between the inputted light and the converted light is known as the Stokes shift and serves as the principle driving mechanism for an energy conversion process corresponding to a change in wavelength of light.

According to one embodiment, each of the photoluminescent materials 68a, 68b are formulated to have a Stokes shift resulting in the converted light having an emission spectrum expressed in a desired color. The photoluminescent materials 68a, 68b may be formulated to luminesce in the same color or different colors. In one embodiment, the energy conversion process may be undertaken by way of down conversion, whereby the inputted light includes light on the lower end of the visibility spectrum such as blue, violet, or ultraviolet (UV) light. Doing so enables blue, violet, or UV LEDs to be used as the LEDs 34a, 34b, which may offer a relative cost advantage over other colors of LEDs or simply using LEDs of the desired color and foregoing the energy conversion process altogether.

In alternative embodiments, each of the energy conversion layers 62a, 62b may include more than one distinct photoluminescent material, each of which is configured to convert inputted light into a longer or shorter wavelength light. In one embodiment, the distinct photoluminescent materials may be interspersed within the energy conversion layer 62a, 62b. Alternatively, the distinct photoluminescent materials may be isolated from each other if desired. For example, the distinct photoluminescent materials may be arranged to alternate in a tessellation or other pattern. In either embodiment, each distinct photoluminescent material may be uniquely excited by a corresponding portion of the LEDs 34s, 34b, which may be variously arranged. In some embodiments, each distinct photoluminescent material may be formulated to have a Stokes shift resulting in the associated converted light having an emission spectrum expressed in a unique color such that the resultant luminescence corresponds to a light mixture of the converted light from each distinct photoluminescent material. By mixing the converted light outputted from two or more distinct photoluminescent materials, a greater diversity of colors may be expressed that would otherwise be unachievable through the excitation of a single photoluminescent material. Contemplated colors include light mixtures containing any combination of red, green, and blue light, all of which may be achieved by selecting the appropriate combinations of photoluminescent materials and LEDs. Additional information on the arrangements of distinct photoluminescent materials and corresponding LEDs is disclosed in U.S. patent application Ser. No. 14/697,035 to Salter et al., entitled "LIGHT-PRODUCING ASSEMBLY FOR A VEHICLE," filed Apr. 27, 2015, the entire disclosure of which are incorporated herein by reference.

In operation, the controller 40 may selectively control the intensity of the LEDs 34a, 34b to ultimately affect the brightness of the luminescent light outputted from the puddle lamp assembly 16 and the dome lamp assembly 22, respectively. For example, increasing the intensity of the LEDs 34a, 34b generally results in the puddle lamp and dome lamp assemblies 16, 22 exhibiting a brighter luminescence. The controller 40 may control the intensity of the LEDs 34a, 34b through pulse-width modulation or direct current control. Additionally or alternatively, the controller 40 may control the light emission duration of the LEDs 34a, 34b to affect the duration in which the puddle lamp and dome lamp assemblies 16, 22 luminesce. For example, the controller 40 may activate the LEDs 34a, 34b for an extended duration such that the puddle lamp and dome lamp assemblies 16, 22 exhibit sustained luminescence. Alternatively, the controller 40 may flash the LEDs 34*a*, 34*b* at varying time intervals such that the puddle lamp and dome lamp assemblies 16, 22 exhibit a blinking effect.

Figure 3:
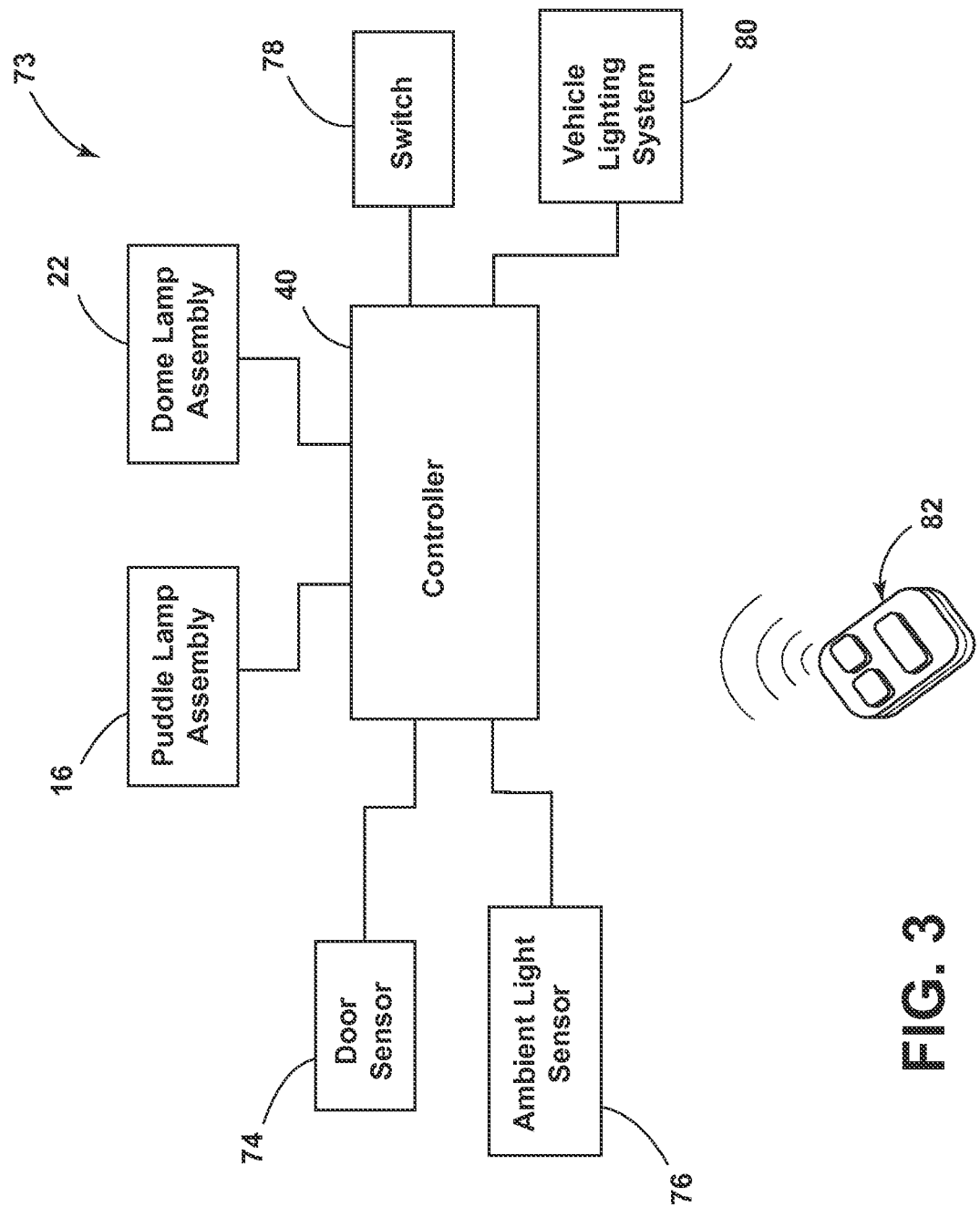
FIG. 3 is a block diagram of a lighting system that utilizes a dual purpose lighting assembly, according to one embodiment.

Referring to FIG. 3, a block diagram of a lighting system 73 utilizing the dual-purpose lighting assembly 14 depicted in FIG. 1 is shown according to one embodiment. In the presently illustrated embodiment, the controller 40 may control an activation state of the puddle and/or dome lamp assemblies 16, 22 based on input from a door sensor 74 of door 12, an ambient light sensor 76, a switch 78, and a vehicle lighting system 80. In one embodiment, the controller 40 activates the puddle lamp assembly 16 when the door sensor 74 indicates that door 12 is in an open position, thereby illuminating the ground area 20 next by the vehicle 10. When the door is closed, the controller 40 can subsequently deactivate the puddle lamp assembly 16. If additional puddle and dome lamp assembles are used in other doorways, the controller 40 may control the associated puddle lamp assemblies in a similar manner based on input received from a corresponding door sensor. In some embodiments, automatic control of the puddle and dome lamp assemblies 16, 22 may be dictated by signals received from the ambient light sensor 76. For example, during the day, there is generally less need for lighting and as such, the controller 40 may refrain from automatically activating the puddle lamp and dome lamp assemblies 16, 22. Nevertheless, in instances where lighting is desired, an occupant may activate the puddle and/or dome lamp assemblies 16, 22 via a corresponding switch 78, which may be located in the vehicle cabin and embodied as a push button, a capacitive switch, and the like. It is also contemplated that the controller 40 may activate the dome lamp assembly 22 in conjunction with other vehicle lighting sources. For example, when dark conditions are present, the vehicle lighting system 80 may prompt various lighting sources to activate once the vehicle 10 has been parked and the engine turned off. In response, the controller 40 may activate the dome lamp assembly 22 to provide cabin lighting. In such instances, the controller 40 may also activate the puddle lamp assembly 16 or otherwise wait for the door 12 to be opened before activating the puddle lamp assembly 16. In other instances, the lighting system 80 may prompt various lighting sources to activate when the doors of the vehicle 10 are unlocked remotely via a key fob 82. In response, the controller 40 may be prompted to activate the puddle and/or dome lamp assemblies 16, 22 to provide additional lighting. It should be appreciated that puddle and dome lamp assemblies located in other doorways may be similarly controlled by the controller 40 or other controller.

Accordingly a dual purpose lighting assembly has been advantageously provided herein. The dual purpose lighting assembly provides puddle lamp and dome lamp functionality and benefits from a thin design and is cost effective to implement.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A dual purpose lighting assembly for a vehicle, comprising:
    a puddle lamp assembly disposed proximate a doorway and operable to emit light by luminescence to illuminate a ground area outside the vehicle; and
    a dome lamp assembly disposed next to the puddle lamp assembly and operable to emit light by luminescence to illuminate a vehicle cabin area, wherein the puddle lamp and dome lamp assemblies together define a curved structure, and wherein the dome lamp is higher positioned relative the puddle lamp.

2. The dual purpose lighting assembly of claim 1, wherein the puddle lamp assembly is coupled to an edge of a roof structure of the vehicle, wherein the edge is located adjacent the doorway.

3. The dual purpose lighting assembly of claim 2, wherein the dome lamp assembly is coupled to the roof structure and located at a greater distance from the doorway relative to the puddle lamp assembly.

4. The dual purpose lighting assembly of claim 3, wherein the roof structure comprises a headliner of the vehicle.

5. The dual purpose lighting assembly of claim 1, wherein the puddle lamp and dome lamp assemblies each comprise a plurality of light sources arranged as printed LEDs and a photoluminescent structure configured to luminesce in response to excitation by light emitted from the plurality of light sources.

6. The dual purpose lighting assembly of claim 1, further comprising at least one controller for selectively operating the puddle lamp and dome lamp assemblies.

7. The dual purpose lighting assembly of claim 6, wherein the controller activates the puddle lamp when a door associated with the doorway is moved to an open position.

8. A dual purpose lighting assembly for a vehicle, comprising:
    a puddle lamp assembly located adjacent a doorway and operable to emit light by luminescence to illuminate a ground area outside the vehicle; and
    a dome lamp assembly disposed next to the puddle lamp assembly and operable to emit light by luminescence to illuminate a vehicle cabin area, wherein the puddle and dome lamp assemblies are each coupled to a roof structure, wherein the puddle lamp and dome lamp assemblies together define a curved structure, and wherein the dome lamp is higher positioned relative the puddle lamp.

9. The dual purpose lighting assembly of claim 8, wherein the dome lamp assembly is located at a greater distance from the doorway relative to the puddle lamp assembly.

10. The dual purpose lighting assembly of claim 8, wherein the roof structure comprises a headliner of the vehicle.

11. The dual purpose lighting assembly of claim 8, wherein the puddle lamp and dome lamp assemblies each comprise a plurality of light sources arranged as printed LEDs and a photoluminescent structure configured to luminesce in response to excitation by light emitted from the plurality of light sources.

12. The dual purpose lighting assembly of claim 8, further comprising at least one controller for selectively operating the puddle lamp and dome lamp assemblies.

13. The dual purpose lighting assembly of claim 12, wherein the controller activates the puddle lamp when a door associated with the doorway is moved to an open position.

14. A dual purpose lighting assembly comprising:
   a first light-producing assembly disposed proximate a doorway and operable to emit light in a vehicle-outward direction;
   a second light-producing assembly disposed next to the first light-producing assembly and operable to emit light in a vehicle-inward direction; and
   a controller for selectively operating the first and second light-producing assemblies based on at least one input signal, wherein the first light-producing and the second light-producing assemblies together define a curved structure, and wherein the second light-producing assembly is higher positioned relative the first light-producing assembly.

15. The dual-purpose lighting assembly of claim 14, wherein the first and second light-producing assemblies each comprise a plurality of light sources arranged as printed LEDs and a photoluminescent structure configured to luminesce in response to excitation by light emitted from the plurality of light sources.

16. The dual-purpose lighting assembly of claim 14, wherein the first and second light-producing assemblies are each coupled to a headliner such that the second light-producing assembly is located at a greater distance from the doorway relative to the first light-producing assembly.

17. The dual-purpose lighting assembly of claim 14, wherein the at least one input signal is received from one of a user-operated switch, a door sensor, an ambient light sensor, and a vehicle lighting system.

18. The dual-purpose lighting assembly of claim 14, wherein the first light-producing assembly is configured as a puddle lamp and the second light-producing assembly is configured as a dome lamp.

* * * * *